(12) United States Patent
Fujimoto et al.

(10) Patent No.: US 8,252,869 B2
(45) Date of Patent: Aug. 28, 2012

(54) PROCESS FOR PRODUCTION OF CROSSLINKED POLY(METH) ACRYLIC ACID NITROXIDE COMPOUNDS

(75) Inventors: Nobutaka Fujimoto, Himeji (JP); Koji Ueda, Himeji (JP); Masato Fujikake, Tokyo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 605 days.

(21) Appl. No.: 11/989,722

(22) PCT Filed: Jun. 29, 2006

(86) PCT No.: PCT/JP2006/313009
§ 371 (c)(1),
(2), (4) Date: Mar. 25, 2008

(87) PCT Pub. No.: WO2007/017994
PCT Pub. Date: Feb. 15, 2007

(65) Prior Publication Data
US 2010/0168360 A1 Jul. 1, 2010

(30) Foreign Application Priority Data
Aug. 5, 2005 (JP) .................................. 2005-228642

(51) Int. Cl.
*C08F 8/06* (2006.01)
*C08F 26/06* (2006.01)

(52) U.S. Cl. ............... 525/327.1; 525/326.7; 525/326.8; 525/330.3; 525/387; 525/265

(58) Field of Classification Search ............... 525/326.7, 525/326.8, 327.1, 330.3, 387
See application file for complete search history.

(56) References Cited

FOREIGN PATENT DOCUMENTS

| CN | 1133600 | 10/1996 |
|---|---|---|
| EP | 1 381 100 | 1/2004 |
| JP | 2001-83672 | * 3/2001 |
| JP | 2002-304996 | 10/2002 |
| JP | 2005-97409 | 4/2005 |
| JP | 2006-16428 | * 1/2006 |
| WO | 95/04089 | 2/1995 |
| WO | 2005/116092 | 12/2005 |

OTHER PUBLICATIONS

Machine translation of JP 2006-16428, Jan. 2006.*
Kurosaki, et al., "Polymers having stable radicals. I. Synthesis of nitroxyl polymers from 4-methacryloyl derivatives of 2,2,6,6-tetramethylpiperidine" J. Polym. Sci. Polym. Chem. Ed., vol. 10, pp. 3295-3310, 1972 (Abstract only).
Notification of the First Office Action issued in counterpart Chinese Application No. 200680025757.X, State Intellectual Property Office of the People's Republic of China, Dec. 4, 2009—10 pages.
Database WPI Week 200136, Thomson Scientific, London, GB; AN 2001-338379—XP002529954.
Wenzhong "Effect of Structure of Polymeric Hindered Amines on the Oxidation of Polymers: Part 1—Syntheses of Polymeric Hindered Piperidyl Esters", Polymer Degradation and Stability, vol. 31, 1991, pp. 353-364.

* cited by examiner

Primary Examiner — Roberto Rabago
(74) Attorney, Agent, or Firm — Hamre, Schumann, Mueller & Larson, P.C.

(57) ABSTRACT

The present invention relates to a crosslinked poly(meth) acrylic acid nitroxide compound resulting from crosslinking of a poly(meth)acrylic acid nitroxide compound, and an object of the present invention is to provide a method of inexpensively and easily producing a crosslinked poly(meth) acrylic acid nitroxide compound having a high radical concentration.

The present invention is a method of producing a crosslinked poly(meth)acrylic acid nitroxide compound including a repeating unit represented by the general formula (2):

[Chem. 2]

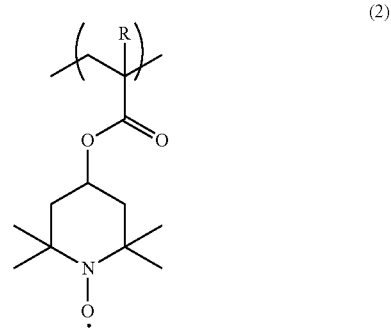

(2)

(in the formula, R represents a hydrogen atom or a methyl group), comprising a nitroxidation step carried out in a state that a crosslinked poly(meth)acrylic acid imino compound resulting from crosslinking of a poly(meth)acrylic acid imino compound including a repeating unit represented by the general formula (1):

[Chem. 1]

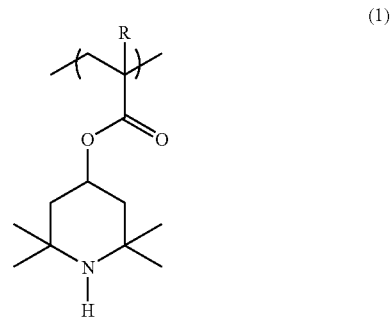

(1)

(in the formula, R represents the same group as that represented by R in said general formula (2)) is dispersed in water.

5 Claims, No Drawings

PROCESS FOR PRODUCTION OF CROSSLINKED POLY(METH) ACRYLIC ACID NITROXIDE COMPOUNDS

TECHNICAL FIELD

The present invention relates to a method of producing a crosslinked poly(meth)acrylic acid nitroxide compound, which is used as an electrode material of a secondary battery high in energy density and in capacity.

BACKGROUND ART

With the rapid market expansion in the fields of laptop computers and cellular phones, there has been a growing demand for small-sized, high-energy-density and high-capacity secondary batteries for use in such machines or instruments. To meet such demand, secondary batteries which utilize an electrochemical reaction associated with a charge transfer, with alkali metal ions such as lithium ions serving as charge carriers, have been developed. In particular, lithium ion secondary batteries are utilized as high-capacity secondary batteries high in energy density and excellent in stability in various electronic machines and instruments. In such lithium ion secondary batteries, a lithium-containing transition metal oxide is generally used as an active material in the positive electrode, and carbon as an active material in the negative electrode, and charging and discharging are carried out by utilizing the insertion and elimination reactions of lithium ions into and from these active materials.

In recent years, secondary batteries in which radical compounds are utilized as electrode active materials directly contributing to an electrode reaction have been of great value, and an electric storage device containing a nitroxyl compound which takes a nitroxyl cation partial structure in an oxidation state and takes a nitroxyl radical partial structure in a reduction state in the positive electrode have been proposed for further capacity increases (see Patent Document 1).

Patent Document 1 discloses a method of producing the nitroxyl compound in which polymethacrylate having a predetermined cyclic imino group in a side chain is dissolved in dichloromethane and oxidized by using meta-chloroperbenzoic acid. However, meta-chloroperbenzoic acid is expensive and highly dangerous, and refinement of its product requires complicated processes.

As a method of producing a nitroxyl compound more inexpensively and more safely, there has been known a method in which a corresponding imino compound is oxidized by using hydrogen peroxide (see Non-Patent Document 1 and Patent Document 2).

Non-Patent Document 1 discloses, for example, a method in which a polymethacrylic acid imino compound is oxidized by a hydrogen peroxide solution in a methanol solvent, which is a good solvent of the polymethacrylic acid imino compound, in the presence of sodium tungstate, and then ether is added to deposit the polymethacrylic acid imino compound. Patent Document 2 discloses a method in which a polymer having a secondary amine structure in a side chain is dissolved in an organic solvent having a low solubility in water and forming a 2-phase system with water, and then the polymer is oxidized by using hydrogen peroxide in the presence of water-soluble oxide catalyst.

However, these producing methods have various problems. In the producing method according to Non-Patent Document 1, for example, there are some problems such that a long time period is needed for the reaction, and that a catalyst is mixed into a polymer in the following refining step. Also, in the producing method according to Patent Document 2, since there is not only a problem that combined use with organic solvents, which are good solvents, needs a separation step, but also a problem that an insufficient reaction rate results in failure to obtain a sufficient radical conversion ratio. Moreover, a safer producing method is desirable so as to improve working environment upon production and to prevent an environmental pollution caused by waste water.

In addition, due to the desire for improving in performance stability of the secondary batteries, an electrode active material which is inhibited from eluting into the solvent contained in an electrolyte has been desired to be proposed; however, in accordance with the conventional techniques, it has been difficult to efficiently produce the nitroxyl compound by using a crosslinked material which is expected to be superior in stability to solvents.

Patent Document 1: Japanese Kokai Publication 2002-304996
Patent Document 2: Japanese Kokai Publication 2005-97409
Non-Patent Document 1: J. Polym. Sci. Polym. Chem. Ed., 10, 3295 (1972)

DISCLOSURE OF THE INVENTION

Problems to be Solved by the Invention

The present invention relates to a crosslinked poly(meth)acrylic acid nitroxide compound resulting from crosslinking of a poly(meth)acrylic acid nitroxide compound, and an object of the present invention is to provide a method of inexpensively and easily producing a crosslinked poly(meth)acrylic acid nitroxide compound having a high radical concentration.

Means for Solving the Problems

The present invention relates to the following method of producing a crosslinked poly(meth)acrylic acid nitroxide compound.

That is, the present invention is a method of producing a crosslinked poly(meth)acrylic acid nitroxide compound including a repeating unit represented by the general formula (2):

[Chem. 2]

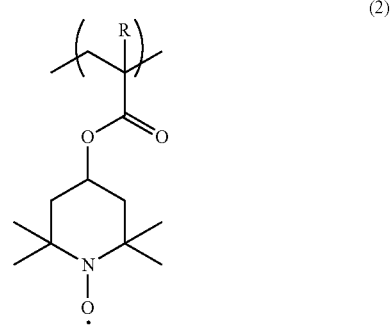

(2)

(in the formula, R represents a hydrogen atom or a methyl group), comprising a nitroxidation step carried out in a state that a crosslinked poly(meth)acrylic acid imino compound resulting from crosslinking of a poly(meth)acrylic acid imino compound including a repeating unit represented by the general formula (1):

[Chem. 1]

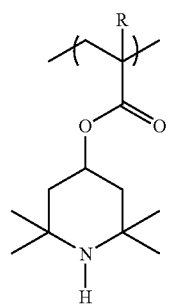
(1)

(in the formula, R represents the same group as that represented by R in said general formula (2)) is dispersed in water.

The present invention is the method of producing a crosslinked poly(meth)acrylic acid nitroxide compound, wherein the nitroxidation step is carried out in the presence of a water-soluble catalyst.

The present invention is the method of producing a crosslinked poly(meth)acrylic acid nitroxide compound, wherein the nitroxidation step is carried out by reacting the crosslinked poly(meth)acrylic acid imino compound with an oxidizing agent.

The present invention is the method of producing a crosslinked poly(meth)acrylic acid nitroxide compound, wherein the oxidizing agent is hydrogen peroxide.

The detailed description of the present invention will be given hereinafter.

Here, in the present invention, acrylic acid and methacrylic acid are referred to as (meth)acrylic acid, and acrylate and methacrylate are referred to as (meth)acrylate.

A crosslinked poly(meth)acrylic acid imino compound used in the present invention results from crosslinking of a poly(meth)acrylic acid imino compound including a repeating unit represented by the following general formula (1).

[Chem. 3]

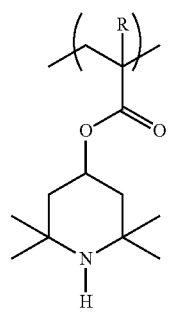
(1)

In the general formula (1), R represents a hydrogen atom or a methyl group.

In the present invention, a content of the repeating unit represented by the general formula (1) in the crosslinked poly(meth)acrylic acid imino compound is not particularly limited, and the content is preferably not less than 60 mol % and less than 100 mol % to all the repeating units contained in the crosslinked poly(meth)acrylic acid imino compound, and the content is more preferably not less than 80 mol % and less than 100 mol %.

Examples of the method of producing the crosslinked poly(meth)acrylic acid imino compound include: a method in which a crosslinking agent is added to crosslink upon polymerizing a (meth)acrylic acid imino compound; a method in which a poly(meth)acrylic acid imino compound is crosslinked by radiation etc.; and the like.

As the crosslinking method by adding the crosslinking agent upon polymerizing the (meth)acrylic acid imino compound, for example, a suspension polymerization method can be used. In the suspension polymerization method, more specifically, a mixture, in which a predetermined amount of the (meth)acrylic acid imino compound, the crosslinking agent, and an oil-soluble radical polymerization initiator are mixed with an inert hydrocarbon-type solvent, is mixed with water containing a stabilizer such as a surfactant and a dispersant, and then the resulting mixture is deoxidized by nitrogen gas to be heated under agitation by using a reactor provided with an agitator, a thermometer, a nitrogen-gas introducer, and a condenser.

A commercially available (meth)acrylic acid imino compound can be used for producing the crosslinked poly(meth)acrylic acid imino compound.

The crosslinking agent added upon polymerizing the (meth)acrylic acid imino compound is not particularly limited as long as the agent is a compound containing a plurality of polymerizable unsaturated groups in a molecule, and examples thereof include a (meth)acrylic acid-type polyfunctional compound, an allyl ether-type polyfunctional compound, a vinyl-type polyfunctional compound, and the like. Examples of the (meth)acrylic acid-type polyfunctional compound include ethylene glycol di(meth)acrylate, diethylene glycol di(meth)acrylate, polyethylene glycol di(meth)acrylate, 1,3-propanediol di(meth)acrylate, 1,3-butanediol di(meth)acrylate, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, trimethylolpropane tri(meth)acrylate, glycerol di(meth)acrylate, 2-hydroxy-3-(meth)acryloyloxypropyl(meth)acrylate, and the like. Examples of the allyl ether-type polyfunctional compound include diethylene glycol diallyl ether, dibutylene glycol diallyl ether, and the like. Examples of the vinyl-type polyfunctional compound include divinylbenzene and the like. Here, each of these crosslinking agents can be used alone, or two or more of these can be used in combination.

The oil-soluble radical polymerization initiator used in the suspension polymerization method is not particularly limited, and examples thereof include: peroxide-type polymerization initiators such as benzoyl peroxide, di-tert-butyl peroxide, lauroyl peroxide, diisopropyl peroxydicarbonate, and dicyclohexyl peroxydicarbonate; azo-type polymerization initiators such as α,α'-azobisisobutyronitrile, 2,2'-azobis-2,4-dimethylvaleronitrile, and dimethyl 2,2'-azobisisobutyrate; redox-type polymerization initiators such as benzoyl peroxide/dimethylaniline, di-tert-butyl peroxide/dimethylaniline, and lauroyl peroxide/dimethylaniline; and the like. The azo-type polymerization initiators such as α,α'-azobisisobutyronitrile can be suitably used among these due to its inexpensiveness and easiness to handle.

Examples of the inert hydrocarbon-type solvent used in the suspension polymerization method include: aromatic hydrocarbon-type solvents such as benzene, toluene, and xylene; acyclic saturated hydrocarbon-type solvents such as n-hexane, n-heptane, and ligroin; cyclic saturated hydrocarbon-type solvents such as cyclopentane, methylcyclopentane, cyclohexane and methylcyclohexane; halogenated hydrocarbon-type solvents such as dichloromethane, chloroform, and dichloroethane; and the like.

Any of anionic surfactants, cationic surfactants, nonionic surfactants and amphoteric surfactants can be used as the surfactant in the suspension polymerization method. The anionic surfactants such as sodium dodecylbenzene sulfonate, sodium lauryl sulfate, sodium dimethyl sulfosuccinate, potassium oleate can be suitably used among these because they are industrially available and inexpensive, and because the quality of compounds to be obtained is stable. Also, as the dispersant, water-soluble polymers such as poly(meth)acrylic acid, polyacrylamide, polyethylene oxide, polyvinyl alcohol, partially saponified polyvinyl acetate, gelatin, starch, a copolymer of styrene and maleic acid, cellulose derivatives such as methyl cellulose, carboxymethyl cellulose, and salts of the celluloses can be suitably used.

A reaction temperature is preferably 30 to 100° C., and more preferably 40 to 80° C. A reaction time period depends on the reaction temperature, but is generally 0.5 to 10 hours.

Since the crosslinked poly(meth)acrylic acid imino compound, which is a reaction product thus obtained, is in a particle state in the reaction solution, it is possible to isolate the compound by filtrating the reaction solution. Moreover, it is possible to refine the compound by removing and washing unreacted materials and the like by using water, hexane, and the like and then drying them.

In the present invention, the nitroxidation step is carried out in a state that the crosslinked poly(meth)acrylic acid imino compound is dispersed in water. Generally, the crosslinked poly(meth)acrylic acid imino compound is not virtually dissolved in the solution in the "state that the crosslinked poly(meth)acrylic acid imino compound is dispersed in water".

In the present invention, the crosslinked poly(meth)acrylic acid imino compound can have any form, and the compound is preferably a powder having a median particle diameter of 1 mm or less, and more preferably 0.5 mm or less, so as to smoothly advance the reaction. Examples of the method of obtaining the crosslinked poly(meth)acrylic acid imino compound in powder form include: a method in which the compound is pulverized by using a typical mixer, a blender, etc.; and the like.

Here, the median particle diameter used herein is an aperture size at which the total weight excesses 50% of the weight of the particles used in the measurement, the total weight being obtained by classifying the particles with use of standard sieves and thereafter adding up weights of the particles left on each of the sieves from the coarser sieve side.

The nitroxidation step in the present invention is preferably carried out in the presence of a water-soluble catalyst.

The water-soluble catalyst is not particularly limited, and examples thereof include catalysts which are generally used in various nitroxidation reactions.

Specific examples of the water-soluble catalyst include oxides of each metal element selected from the group VI elements of the 18-group type periodic table of the elements, alkali metal salts and ammonium salts of each of the oxides, and the like. More specific examples thereof include: oxides such as phosphotungstic acid, molybdic acid, phosphomolybdic acid, and paramolybdic acid; sodium salts, potassium salts, and ammonium salts of tungstic acid, phosphotungstic acid, paratungstic acid, silicotungstic acid, molybdic acid, phosphomolybdic acid, paramolybdic acid, etc.; and the like. Sodium salts of tungstic acid, phosphotungstic acid, and silicotungstic acid can be suitably used among these. Here, these water-soluble catalysts may be used alone or in combination of two or more.

An amount of the water-soluble catalyst is preferably 0.0001 to 0.15 mol per 1 mol of the (meth)acrylic acid imino compound used for producing the crosslinked poly(meth)acrylic acid imino compound, and more preferably 0.001 to 0.1 mol, so as to smoothly advance the reaction and to obtain effects that measure up to the amount.

The nitroxidation step in the present invention is preferably carried out by reacting the crosslinked poly(meth)acrylic acid imino compound with the oxidizing agent.

The oxidizing agent is not particularly limited, and examples thereof include: inorganic-type peroxides such as hydrogen peroxide and sodium peroxide; halogens such as chlorine, bromine, and iodine; nitric acid-type compounds such as nitric acid and nitrous acid; metal oxides such as copper oxide and lead oxide; metal chlorides such as ferric chloride; ferricyanides such as potassium ferricyanide; permanganates such as potassium permanganate and sodium permanganate; persulfates such as potassium persulfate, sodium persulfate, and ammonium persulfate; percarbonates such as sodium percarbonate and ammonium percarbonate; perborates such as potassium perborate and sodium perborate; perphosphates such as potassium perphosphate; chromates such as potassium chromate and sodium chromate; chlorates such as sodium chlorate; chlorites such as nickel chlorite and ammonium chlorite; hypochlorites such as potassium hypochlorite and sodium hypochlorite; bromates such as potassium bromate; organic-type peroxides such as peracetic acid, t-butyl peracetate, perbenzoic acid, t-butyl perbenzoate benzoyl peroxide, dicumyl peroxide, cumene hydroperoxide, and t-butyl hydroperoxide; and a mixture of these oxidizing agents. Hydrogen peroxide can be suitably used among these.

An amount of the oxidizing agent is preferably 1 to 50 mol per 1 mol of the (meth)acrylic acid imino compound used for producing the crosslinked poly(meth)acrylic acid imino compound, and more preferably 5 to 30 mol, so as to smoothly advance the reaction and to obtain effects that measure up to the amount.

In the present invention, acid may be added if necessary in order to prevent decomposition of the oxidizing agent. For example, hydrochloric acid, nitric acid, sulfuric acid, and the like can be used as the acid to be added. An amount of the acid is preferably 0.00001 to 0.15 mol per 1 mol of the oxidizing agent, and more preferably 0.0001 to 0.1 mol.

An amount of water for dispersing the crosslinked poly(meth)acrylic acid imino compound in the present invention is preferably 500 to 5000 parts by weight, and more preferably 1000 to 4000 parts by weight, per 100 parts by weight of the crosslinked poly(meth)acrylic acid imino compound, so as to smoothly advance the reaction. Here, a solvent, which is a poor solvent to the crosslinked poly(meth)acrylic acid imino compound and is compatible to water, may be contained in water as long as the crosslinked poly(meth)acrylic acid imino compound is not virtually dissolved in the solvent. Examples of such a solvent include: alcohols such as methanol, ethanol, and t-butyl alcohol; acetonitrile; and the like.

The method of dispersing the crosslinked poly(meth)acrylic acid imino compound in water in the present invention is not particularly limited, and examples thereof include: a method in which the crosslinked poly(meth)acrylic acid imino compound is gradually added to water while a predetermined amount of water is agitated; and the like.

The method of reacting the crosslinked poly(meth)acrylic acid imino compound with the oxidizing agent in the present invention is not particularly limited, and a method in which the crosslinked poly(meth)acrylic acid imino compound, the water-soluble catalyst, and water are mixed in advance and then the oxidizing agent is added under agitation is preferable so as to enable a safe, easy, and efficient reaction.

A reaction temperature is preferably 0 to 90° C., and more preferably 20 to 80° C. A reaction time period depends on the reaction temperature, but is generally 1 to 24 hours, and preferably 3 to 12 hours. Here, in the case that the reaction is made to occur while the oxidizing agent is added, it is preferable to keep the temperature for further 1 to 10 hours under agitation after finishing addition of the oxidizing agent.

The crosslinked poly(meth)acrylic acid nitroxide compound thus obtained can be easily isolated from the reaction solution by combining unit operations such as filtration and drying.

Since the present invention includes the above-mentioned constituents, in contrast to the conventional method in which the crosslinked poly(meth)acrylic acid imino compound is dissolved in an organic solvent in a nitroxidation reaction, it is possible to shorten a reaction time period and to improve working environment, and even in the case of using the water-soluble solvent, it is possible to prevent the water-soluble solvent from mixing into the crosslinked poly(meth)acrylic acid nitroxide compound and to facilitate the refining step; furthermore, it is possible to improve a reaction rate and to set a radical conversion ratio to 60 to 100%, and preferably 80 to 100%, of the number of the imino group before the nitroxidation step, and in the case of using the crosslinked poly(meth)acrylic acid nitroxide compound to be obtained as, for example, a secondary battery, it is possible to prevent the compound from eluting into the solvent contained in the electrolyte.

Here, the present invention describes the crosslinked poly(meth)acrylic acid nitroxide compound as an electrode active material that is superior in stability to solvents and suitably used in a secondary battery; however, in the case of using the poly(meth)acrylic acid imino compound in place of the crosslinked poly(meth)acrylic acid imino compound, it is also possible to easily and efficiently produce the poly(meth)acrylic acid nitroxide compound in the same manner as that in the present invention.

Effects of the Invention

The present invention provides a method of inexpensively and easily producing a crosslinked poly(meth)acrylic acid nitroxide compound useful as an electrode active material of a secondary battery.

BEST MODE FOR CARRYING OUT THE INVENTION

The specific description of the present invention will be given hereinbelow with examples and comparative examples, but the present invention is not limited to these examples.

Production Example 1

A homogeneous solution was obtained by mixing, in a 200 mL Erlenmeyer flask, 22.5 g (100 mmol) of 2,2,6,6-tetrametyl-4-piperidinylmethacrylate, 0.4 g (2 mmol) of ethylene glycol dimethacrylate as a crosslinking agent, 0.115 g (0.7 mmol) of α,α'-azobisisobutylonitrile as a polymerization initiator, and 35 mL of toluene. Next, 200 mL of water, and 0.3 g of sodium dodecylbenzene sulfonate as a surfactant, were mixed in a 500 mL four-neck flask provided with an agitator, a nitrogen-gas introducer, a thermometer, and a reflux condenser tube, and then this solution was kept at a temperature of 25° C.; thereafter, the homogeneous solution was added to be dispersed under agitation. Subsequently, oxygen in the reaction system was removed by introducing nitrogen gas, and then the reaction was advanced at a temperature of 60° C. for six hours. After finishing of the reaction, the reaction solution was cooled to room temperature and then filtrated. The residue was washed with 500 mL of water and subsequently with 500 mL of hexane, and then dried under reduced pressure; thereafter, the dried material was pulverized with Wonder Blender (produced by OSAKA CHEMICAL Co., Ltd.), so that 22.78 g of a crosslinked polymethacrylic acid imino compound (yield: 99.5%), which was a white powder having a median particle diameter of 230 μm, was obtained.

Example 1

First, 10 g of the crosslinked polymethacrylic acid imino compound obtained in Production Example 1, 0.73 g (2.2 mmol) of sodium tungstate dihydrate, and 300 mL of water were mixed in a 500 mL four-neck flask provided with an agitator, a nitrogen-gas introducer, a thermometer, a reflux condenser tube, and a dropping funnel, and then the mixture was kept at a temperature of 80° C.; thereafter, oxygen in the reaction system was removed by introducing nitrogen gas. Next, 100.8 g (890 mmol) of a 30% hydrogen peroxide solution was dropped for eight hours in a state that the crosslinked polymethacrylic acid imino compound was uniformly dispersed under agitation. Subsequently, the mixture was kept at a temperature of 80° C. for three hours under agitation, and then the reaction solution was filtrated and washed with 500 mL of water and subsequently with 500 mL of methanol. Thereafter, the residue was dried under reduced pressure, so that 10.47 g of a crosslinked polymethacrylic acid nitroxide compound (yield: 98.2%), which was a red powder, was obtained.

Radical conversion ratio of the obtained crosslinked polymethacrylic acid nitroxide compound measured 95.5%. Here, the radical conversion ratio was calculated as follows: an absorption integrated intensity was obtained by integrating a first differential ESR spectrum two times, the first differential ESR spectrum measured in the range of 335.9 mT±5 mT, under conditions that a microwave output was 4 mW, a modulation frequency was 100 kHz, and a modulation amplitude was 79 μT, by using JES-FR30EX free-radical monitor (produced by JEOL Ltd.); and the absorption integrated intensity was compared with that of a known sample (4-hydroxy-2,2,6,6-tetramethylpiperidinooxy free radical (4-TEMPOL)) measured under the same conditions.

Reference Example 1

A homogeneous solution was obtained by mixing 70 g (311 mmol) of 2,2,6,6-tetramethyl-4-piperidinylmethacrylate and 300 mL of tetrahydrofuran in a 500 mL four-neck flask provided with an agitator, a nitrogen-gas introducer, a thermometer, and a reflux condenser tube. This solution was kept at a temperature of 25° C., and then oxygen in the reaction system was removed by introducing nitrogen gas; thereafter 0.358 g (2.2 mmol) of α,α'-azobisisobutylonitrile was added as a polymerization initiator to react at a temperature of 50° C. for six hours under agitation. After completion of the reaction, the reaction solution was cooled to room temperature, and then added into 2000 mL of hexane to be filtrated. Furthermore, the residue was washed with 500 mL of hexane, and then dried under reduced pressure; thereafter, the dried material was pulverized with Wonder Blender (produced by OSAKA CHEMICAL Co., Ltd.), so that 68.32 g of a polymethacrylic acid imino compound (yield: 97.6%), which was a white powder having a median particle diameter of 230 μm, was obtained.

Next, 10 g of the polymethacrylic acid imino compound, 0.73 g (2.2 mmol) of sodium tungstate dihydrate, and 300 mL of water were mixed in a 500 mL four-neck flask provided with an agitator, a nitrogen-gas introducer, a thermometer, a reflux condenser tube, and a dropping funnel, and then the mixture was kept at a temperature of 25° C. and oxygen in the reaction system was removed by introducing nitrogen gas; thereafter, 50.4 g (445 mmol) of a 30% hydrogen peroxide solution was dropped for three hours in a state that the polymethacrylic acid imino compound was uniformly dispersed under agitation. Subsequently, the mixture was heated to a temperature of 80° C., and then 50.4 g (445 mmol) of a 30% hydrogen peroxide solution was further dropped for three hours; thereafter, the mixture was kept at a temperature of 80° C. for three hours under agitation. Subsequently, the reaction solution was filtrated, and then washed with 500 mL of water and subsequently with 500 mL of methanol; thereafter, the residue was dried under reduced pressure, so that 10.46 g of a polymethacrylic acid nitroxide compound (yield: 98.1%), which was a red powder, was obtained.

A radical conversion ratio of the obtained polymethacrylic acid nitroxide compound was found to be 99.6% upon measurement thereof in the same manner as that in Example 1.

Reference Example 2

First, 10 g of the polymethacrylic acid imino compound obtained in Reference Example 1, 0.73 g (2.2 mmol) of sodium tungstate dihydrate, and 300 mL of chloroform, which is a good solvent to a polymethacrylic acid imino compound, were mixed in a 500 mL four-neck flask provided with an agitator, a nitrogen-gas introducer, a thermometer, a reflux condenser tube, and a dropping funnel. The mixture was kept at a temperature of 50° C. under agitation, and then oxygen in the reaction system was removed by introducing nitrogen gas; thereafter, 50.4 g (445 mmol) of a 30% hydrogen peroxide solution was dropped for three hours. Subsequently, the mixture was heated to a temperature of 80° C., and then 50.4 g (445 mmol) of the 30% hydrogen peroxide solution was further dropped for three hours; thereafter, the mixture was kept at a temperature of 80° C. for three hours under agitation. Subsequently, the reaction solution was at rest for an hour at room temperature to separate an organic phase and chloroform was distilled off, and then the residue was dried under reduced pressure, so that 10.07 g (yield: 97.3%) of a polymethacrylic acid nitroxide compound, which was a red powder, was obtained.

A radical conversion ratio of the obtained polymethacrylic acid nitroxide compound was found to be 52.6% upon measurement thereof in the same manner as that in Example 1.

INDUSTRIAL APPLICABILITY

The present invention can provide a method of easily and efficiently producing an electrode material which is useful for a secondary battery high in capacity.

The invention claimed is:
1. A method of producing a crosslinked poly(meth)acrylic acid nitroxide compound including a repeating unit represented by formula (2):

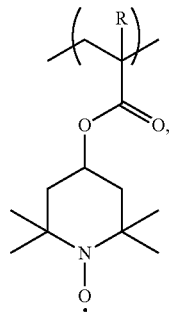

wherein in the formula (2), R represents a hydrogen atom or a methyl group, comprising:
  a nitroxidation step carried out in a state in which a crosslinked poly(meth)acrylic acid imino compound resulting from crosslinking of a poly(meth)acrylic acid imino compound including a repeating unit represented by formula (1) is dispersed in water:

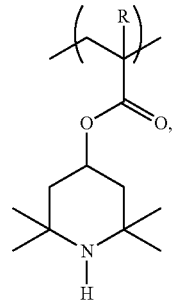

wherein in the formula (1), R represents the same group as that represented by R in said formula (2),
  wherein the crosslinked poly(meth)acrylic acid imino compound is crosslinked during polymerization for forming the poly (meth)acrylic acid imino compound in the presence of a crosslinking agent, the crosslinking agent being at least one selected from the group consisting of a (meth)acrylic acid-type polyfunctional compound, an allyl ether-type polyfunctional compound, and a vinyl-type polyfunctional compound, and
  the crosslinked poly(meth)acrylic acid imino compound is a powder having a median particle diameter of 1 mm or less.

2. The method of producing a crosslinked poly(meth)acrylic acid nitroxide compound according to claim 1, wherein said nitroxidation step is carried out in the presence of a water-soluble catalyst.

3. The method of producing a crosslinked poly(meth)acrylic acid nitroxide compound according to claim 1, wherein said nitroxidation step is carried out by reacting the crosslinked poly(meth)acrylic acid imino compound with an oxidizing agent.

4. The method of producing a crosslinked poly(meth)acrylic acid nitroxide compound according to claim 3, wherein said oxidizing agent is hydrogen peroxide.

5. The method of producing a crosslinked poly(meth)acrylic acid nitroxide compound according to claim 1, wherein the crosslinked poly(meth)acrylic acid nitroxide compound consists essentially of the repeating unit represented by the formula (2) as a repeated unit.

* * * * *